(12) United States Patent
Isbister

(10) Patent No.: US 9,009,222 B2
(45) Date of Patent: Apr. 14, 2015

(54) VERIFYING THE TRANSFER OF A DATA FILE

(75) Inventor: Gregor Donald Isbister, London (GB)

(73) Assignee: Blis Media Limited, London (GB)

( * ) Notice: Subject to any disclaimer, the term of this patent is extended or adjusted under 35 U.S.C. 154(b) by 320 days.

(21) Appl. No.: 13/589,310

(22) Filed: Aug. 20, 2012

(65) Prior Publication Data

US 2013/0046817 A1    Feb. 21, 2013

(30) Foreign Application Priority Data

Aug. 20, 2011   (GB) .................................. 1114408.6

(51) Int. Cl.
*G06F 15/16*   (2006.01)
*H04L 29/08*   (2006.01)
*H04L 29/06*   (2006.01)

(52) U.S. Cl.
CPC ................ *H04L 67/06* (2013.01); *H04L 69/24* (2013.01)

(58) Field of Classification Search
USPC .................................. 709/203; 713/170, 176
See application file for complete search history.

(56) References Cited

U.S. PATENT DOCUMENTS

| | | | | |
|---|---|---|---|---|
| 6,363,479 | B1 * | 3/2002 | Godfrey et al. ................ | 713/160 |
| 2002/0144110 | A1 * | 10/2002 | Ramanathan ................. | 713/156 |
| 2003/0218629 | A1 * | 11/2003 | Terashima et al. ............ | 345/738 |
| 2004/0243852 | A1 * | 12/2004 | Rosenstein .................... | 713/201 |
| 2005/0160273 | A1 * | 7/2005 | Oishi ............................. | 713/180 |
| 2009/0077383 | A1 * | 3/2009 | de Monseignat et al. ..... | 713/175 |
| 2010/0017615 | A1 * | 1/2010 | Boesgaard Sorensen .... | 713/176 |

FOREIGN PATENT DOCUMENTS

| | | |
|---|---|---|
| GB | 2 400 933 A | 10/2004 |
| WO | 03/046688 A2 | 6/2003 |
| WO | 2008/071795 A2 | 6/2008 |

* cited by examiner

*Primary Examiner* — Thomas Dailey

(74) *Attorney, Agent, or Firm* — Harness, Dickey & Pierce, P.L.C.

(57) ABSTRACT

Techniques for verifying the transfer from a content provider of a selected data file selected by a client device using a proxy server is disclosed. By creating a local set of characteristics of the selected data file, network traffic sent between the client device and the content provider can be monitored. A local record of a transfer session is then created, and a download request from the client device is received and forwarded, thus initiating the transfer of the selected data file to the content provider. A data file is then received from the content provider and forwarded to the client device. The characteristics of the received data file are evaluated, thus allowing verification that the characteristics of the received data file match the local set of characteristics of the selected data file to take place. Finally, the received data file is forwarded to the client device.

17 Claims, 10 Drawing Sheets

VERIFYING THE TRANSFER OF A DATA FILE

CROSS REFERENCE TO RELATED APPLICATIONS

This application claims priority from United Kingdom Patent Application No. 11 14 408.6, filed Aug. 20, 2011, the entire disclosure of which is incorporated herein by reference in its entirety.

BACKGROUND OF THE INVENTION

1. Field of the Invention

The present invention relates to the verification of the transfer of data files from a content provider to a client device using a proxy server.

2. Description of the Related Art

It is common for developers to wish to advertise the availability of a new data file from a content provider, such as an application in an application store. Advertisements may be incorporated in the form of a hyperlink into websites accessible by client devices, such as cellular telephones or tablet computers with internet access using browsing software. When a user is enticed to click on the hyperlink, the uniform resource identifier (URI) of the hyperlink invokes a proprietary content store program interface to enable a user to initiate a download of the advertised application.

However, due to the nature of the content provider's systems, tracking of a user's interactions within the content provider's store, such as downloading a data file, is not possible. It is therefore not possible to know if a data file has been transferred. In addition, network providers may wish to record the number of transfer of data files in order to predict network load, which again, is not currently possible in such environments.

BRIEF SUMMARY OF THE INVENTION

According to an aspect of the present invention, there is provided a method of verifying the transfer from a content provider of a selected data file selected by a client device using a proxy server, comprising steps of: creating a local set of characteristics of the selected data file; monitoring network traffic sent between the client device and the content provider to create a local record of a transfer session; receiving and forwarding a download request from the client device to initiate the transfer of the selected data file to the content provider; receiving a data file as a received data file from the content provider and forwarding said data file to the client device; evaluating characteristics of said received data file; verifying that the characteristics of said received data file match the local set of characteristics of the selected data file; and forwarding the received data file to the client device.

According to another aspect of the present invention, there is provided proxy server apparatus for verifying the delivery by a content provider of a selected data file selected by a client device, comprising a processor, memory and a network interface, wherein said processor is configured to: create a local set of characteristics of the selected data file; monitor network traffic sent between the client device and the content provider to create a local record of a transfer session; receive and forward a download request from the client device to initiate the transfer of the selected data file to the content provider; receive a data file as a received data file from the content provider; evaluate characteristics of said received data file; verify that the characteristics of said received data file match the local set of characteristics of the selected data file; and forward said data file to the client device.

According to a further aspect of the present invention, there is provided a non-transitory computer-readable medium having computer-readable instructions executable by a computer that, when executed by the computer, cause the computer to operate as a proxy server, and to carry out a method of verifying the transfer from a content provider of a selected data file selected by a client device, by performing steps of: creating a local set of characteristics of the selected data file; monitoring network traffic sent between the client device and the content provider to create a local record of a transfer session; receiving and forwarding a download request from the client device to initiate the transfer of the selected data file to the content provider; receiving a data file as a received data file from the content provider and forwarding said data file to the client device; evaluating characteristics of said received data file; verifying that the characteristics of said received data file match the local set of characteristics of the selected data file; and forwarding the received data file to the client device.

DETAILED DESCRIPTION OF EXAMPLE EMBODIMENTS

FIG. 1

Figure 1:
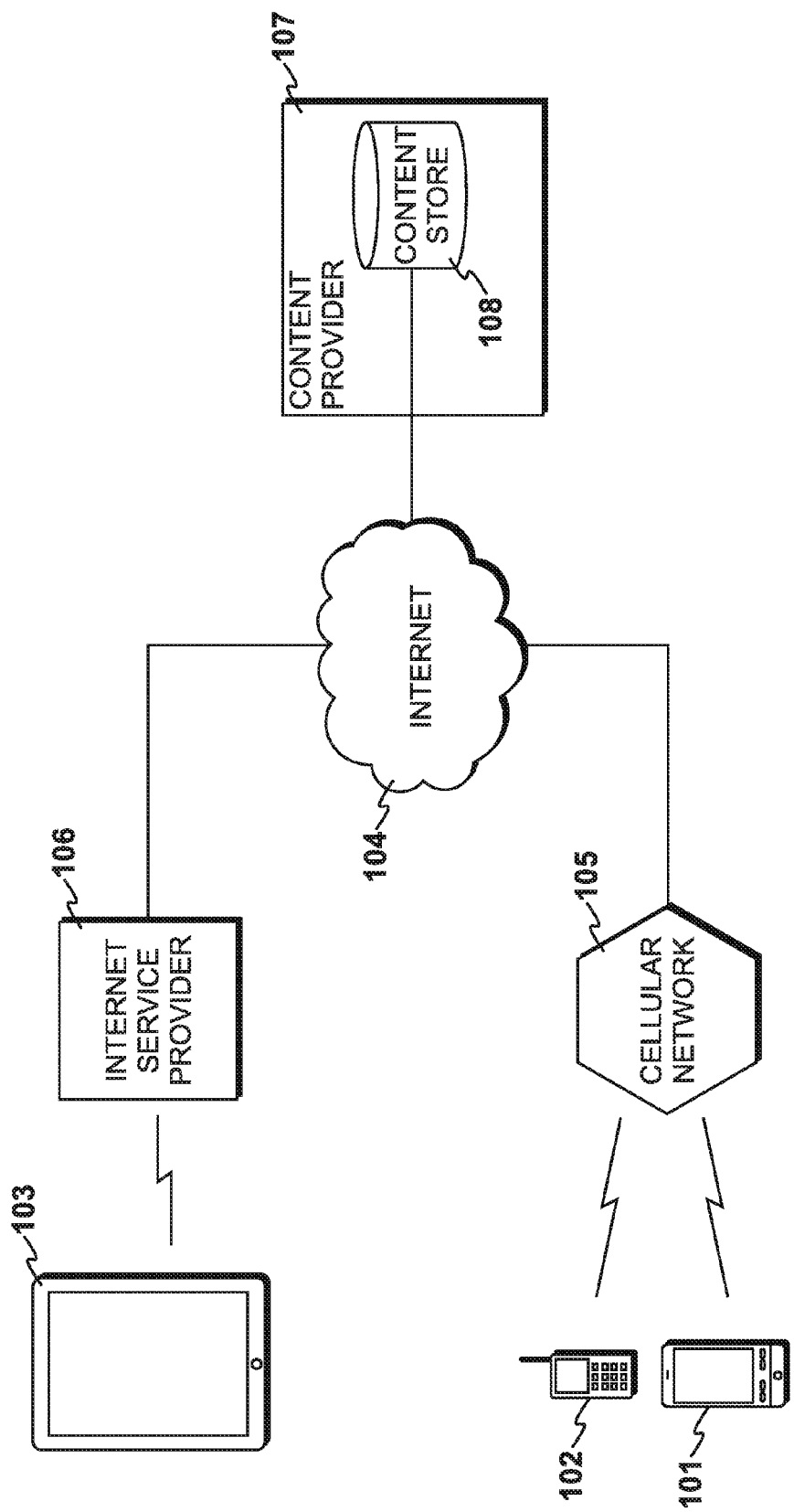
FIG. 1 shows an environment in which the present invention may be embodied.

An environment in which the present invention may be embodied is illustrated in FIG. 1.

Several client devices, such as smartphone 101, cell phone 102 and tablet computer 103 are connected to the Internet 104 via access providers such as a cellular network 105 and an internet service provider 106. Smartphone 101 and cell phone 102 communicate with cellular network 105 using a data connection, which is this example is HSPA. It should be appreciated, however, that the type of the data connection is immaterial, and as such could be LTE® or WiMAX®. In this example, tablet computer 103 communicates with internet service provider 106 using WiFi® in order to access the Internet 104.

Also connected to the Internet 104 is a content provider 107. Content provider 107 provides many services to client devices, and includes a content store 108 from which various data files are made available. Some types of data files, such as web pages and images, are made available for use by any client device. However, some types of data files, such as applications, are only made available to certain types of client devices running proprietary software in a "walled garden" network configuration. Due to this configuration, it is not possible for the owners of cellular network 105 and internet service provider 106 to accurately assess the number of transfers of such data files across their networks. Statistics indicating the number of transfers of application data files or video data files, for example, are particularly useful in predicting the amount of network bandwidth that is likely to be consumed by client devices. At present, it is known that particular applications are bandwidth-hungry and may cause network usage spikes. As bandwidth is financially expensive, internet service providers and cellular network owners require a mechanism to assess the install base of such applications amongst client devices in order to predict their impact on network performance.

In addition, it has been recognised that the owners of the data files, who recruit content providers such as content provider 107 to make their data files available, are not able to accurately track the number of transfers of their application data files, say, to client devices. This presents particular problems when an advertiser's services have been enlisted to promote the availability of an owner's data files from content provider 107, say.

The invention described herein therefore provides a method of, and a proxy server apparatus for, verifying the transfer from a content provider of a selected data file selected by a client device.

FIG. 2

Figure 2:
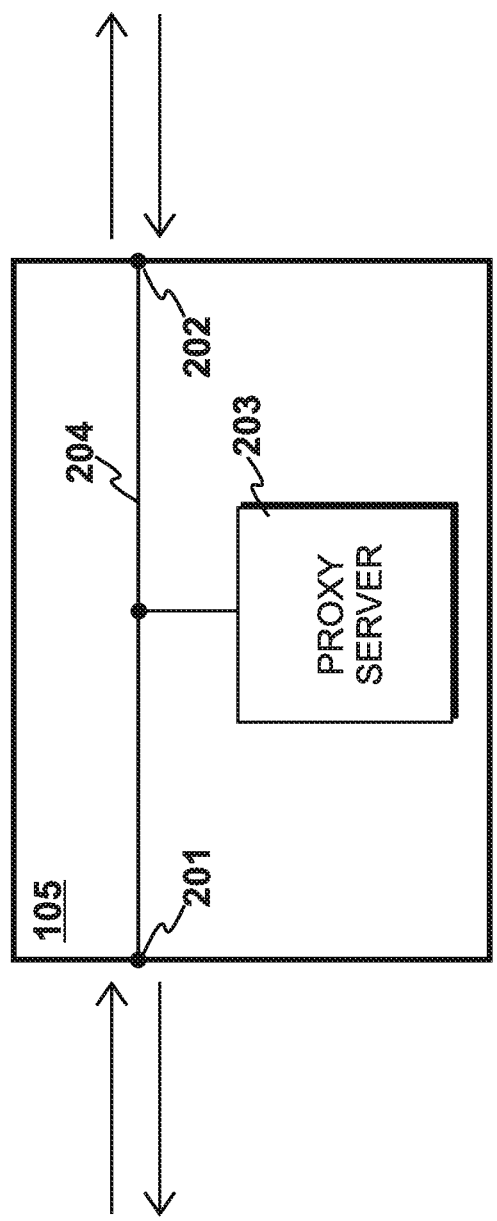
FIG. 2 shows a proxy server according to an embodiment of the present invention installed in a cellular network.
Figure 3:
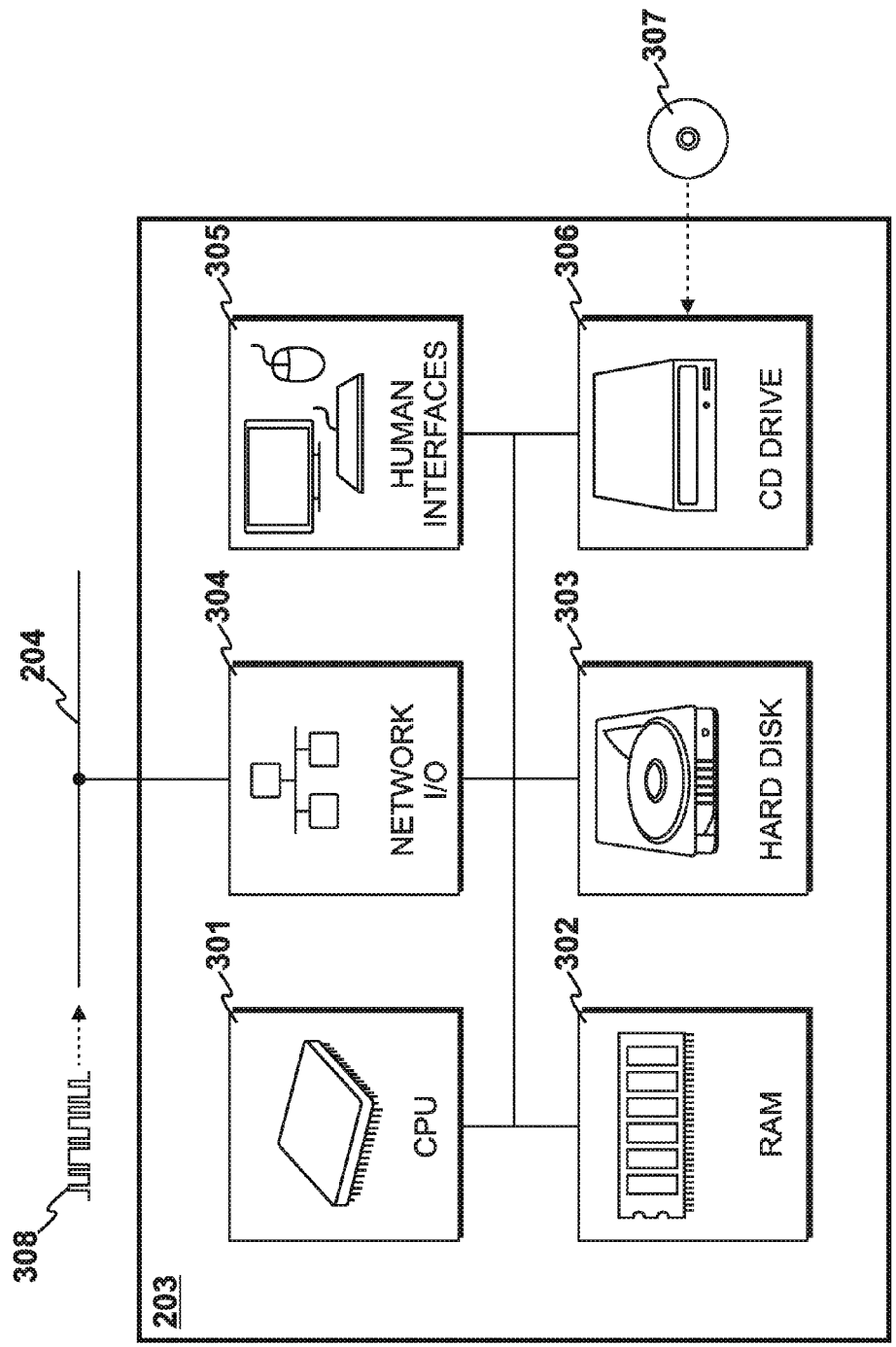
FIG. 3 illustrates components within the proxy server.

Cellular network 105 is shown in more detail in FIG. 2.

Network traffic sent between a client device such as smartphone 101 and cellular network 105 via a base station (not shown) is received at cell-side gateway 201, whilst network traffic sent between cellular network and Internet 104 is sent via an internet-side gateway 202. A proxy server 203 is connected to an internal network 204 and serves as a proxy for network traffic sent between the two gateways. Proxy server 203 provides the computing capability to verify the transfer from a content provider of a selected data file selected by a client device.

Whilst the configuration of proxy server 203 is described herein with reference to its installation in cellular network 105, it will be appreciated that proxy server 203 could equally be used by internet service provider 106 by installing it within their internal network such that it performs substantially the same operations as within cellular network 105.

FIG. 3

Figure 4:
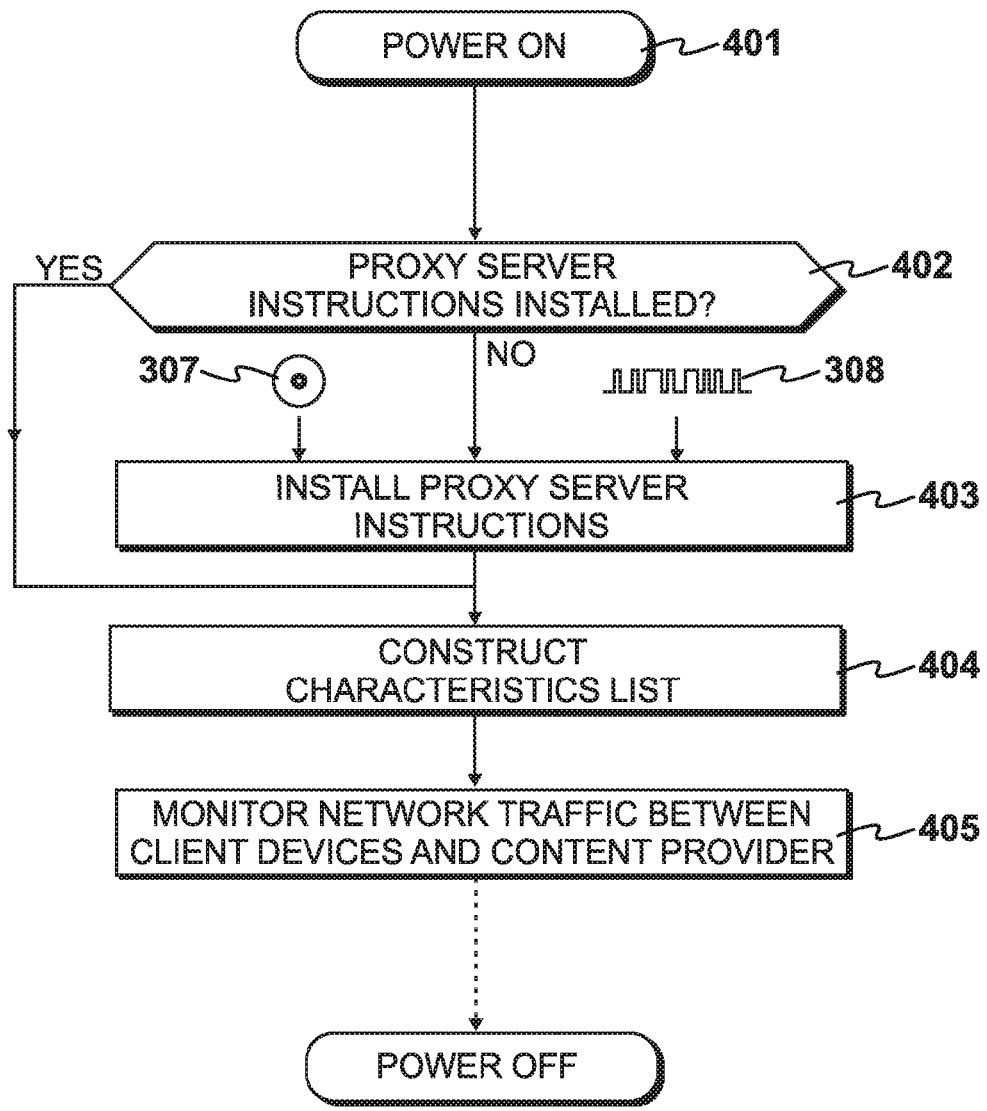
FIG. 4 shows an overview of procedures carried out by the proxy server.

An illustration of components within proxy server 203 is shown in FIG. 4.

In order for proxy server 203 to execute instructions, it comprises a processor such as central processing unit (CPU) 301. In this instance, CPU 301 is a single Intel® Xeon® processor. It is possible that in other configurations several such CPUs will be present to provide a high degree of parallelism in the execution of instructions.

Memory is provided by 8 gigabytes of DDR3 random access memory (RAM) 302, which allows storage of frequently-used instructions and data structures by proxy server 203. A portion of RAM 302 is reserved as shared memory, which allows high speed inter-process communication between applications running on proxy server 203.

Permanent storage is provided by a storage device such as hard disk drive 303, which in this instance has a capacity of 1 terabyte. Hard disk drive 303 stores operating system and application data. In alternative embodiments, a number of hard disk drives could be provided and configured as a RAID array to improve data access times. Hard disk drive 303 contains a list having information pertaining to which data files' transfer is to be monitored and verified, along with a list of characteristics of these data files.

A network interface 304 allows proxy server 203 to connect to a network such as internal network 204. In an embodiment of the present invention, network interface 304 is configured to only receive, process and forward network traffic that is sent between client devices, such as smartphone 101 or tablet computer 103, and a content provider such as content provider 107. In the present embodiment, this is achieved by an access provider configuring domain name server (DNS) settings such that only network traffic to and from a content provider is routed through proxy server 203. In alternative arrangement, proxy server 203 acts as a proxy for all network traffic and inspects hypertext transfer protocol (HTTP) headers for data signifying that it should process certain network traffic and simply route all other network traffic.

In addition, proxy server 203 comprises a number of human interfaces 305 that allow an administrator to interact with and configure it. In alternative cases, proxy server 203 does not include human interfaces, and an administrator interacts with and configures it via another computer using a protocol such as secure shell.

Proxy server 203 also comprises an optical drive, such as a CD-ROM drive 306, into which an optical disk, such as a CD-ROM 307 can be inserted. CD-ROM 307 comprises computer-readable instructions that are installed on hard disk drive 303, loaded into RAM 302 and executed by CPU 301. Alternatively, the instructions (illustrated as 308) may be transferred from a network location over internal network 204 using network interface 304

It is to be appreciated that the above system is merely an example of a configuration of system that can fulfil the role of proxy server 203. Any other system having a processor, memory, and a network interface could equally be used.

FIG. 4

An overview of procedures carried out by the proxy server is shown in FIG. 4.

At step 401, proxy server 203 is powered on, and at step 402 a question is asked as to whether the proxy server instructions are installed. If the proxy server is new on the network then this question will be answered in the negative and instructions are installed at step 403, for example from a computer-readable medium such as CD-ROM 307 or using network-sourced instructions 308 from a network location in internal network 204.

At step 404, a list of characteristics of data files available from a content provider is constructed; steps carried out to construct this list will be described further with reference to FIGS. 5 and 6. At step 405, network traffic sent between client devices and a content provider, such as content provider 107, is monitored in order to verify transfers of data files. Step 405 is continued until the proxy server is powered off, either intentionally for maintenance or due to a systems crash.

FIG. 5

Figure 5:
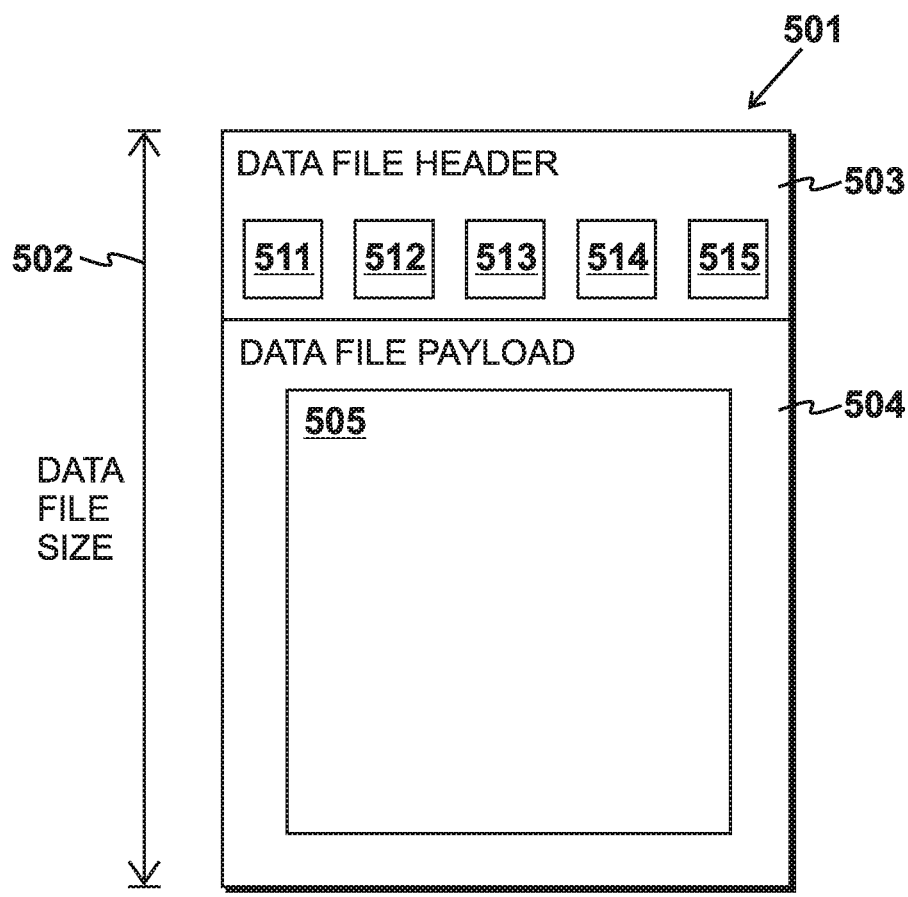
FIG. 5 shows an illustration of the structure of a data file available from a content store.

An illustration of the structure of a data file available from content store 108 is shown in FIG. 5.

A data file 501 has a file size 502, which is typically around 1 megabyte (MB). Some data files, however, may be considerably larger. Data file 501 comprises a header 503 containing attributes pertaining to the content of data file 501, which content is stored in a payload 504 as a package 505. The information stored in header 503 includes the data file's hash 511, such as an MD5 checksum, the file size 512, the name of the package 513 (the actual file that contains the data file's data), a version number 514 and a URI 515 of a web page provided by content provider 105 that contains information about the data file that is presented to a user of a client device. In the present embodiment of the invention, each of these characteristics of a data file such as data file 501 are used during step 404 to create a "fingerprint" of the data file that is stored in a characteristics list in proxy server 203. The characteristics list is a data structure having keys that are the data files' particular identifiers (such as ordinal numbers or their names) and values that are the fingerprints. The process of creating a fingerprint of a data file will be described further with reference to FIG. 6.

FIG. 6

Figure 6:
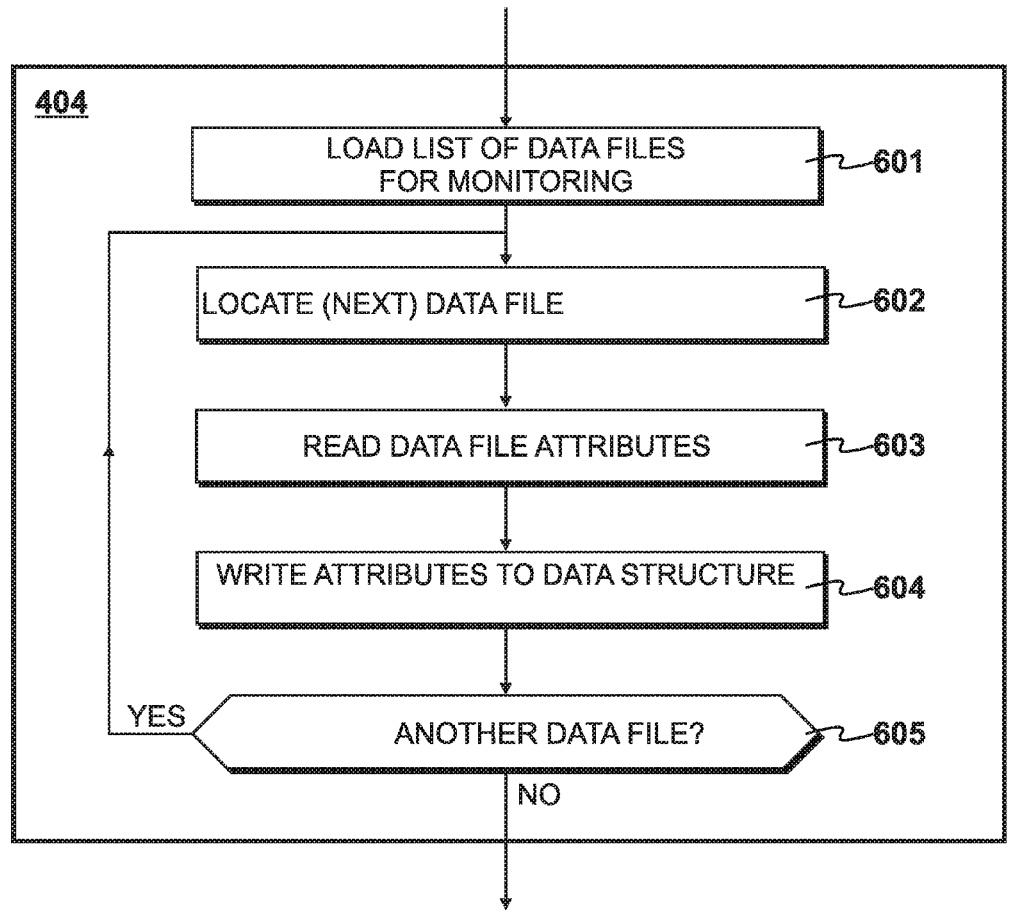
FIG. 6 details the procedures carried out to create a characteristics list.

The procedures carried out during step 404 to create a characteristics list are detailed in FIG. 6.

At step 601, proxy server 203 loads a list of data files whose transfer from content provider 107 to a client device such as smartphone 101 is to be monitored. This list is either preconfigured by the vendor of proxy server 203, or by its owner, i.e. an access provider such as cellular network 105. The list contains the locations of exemplar data files that are to be used in the creation of data file fingerprints. At step 602, a data file is located, and at step 603 its header is read to ascertain the data file's attributes. Optionally, a data file's payload is read in addition to its header. These attributes are then stored in a data structure called a characteristics list at step 604, thus creating a fingerprint for a particular data file. At step 605, a question is asked as to whether there is another data file in the list, and if answered in the affirmative control is returned to step 602 where the next data file is assessed. If answered in the negative, then all data files have been assessed and step 404 is complete.

FIG. 7

Figure 7:
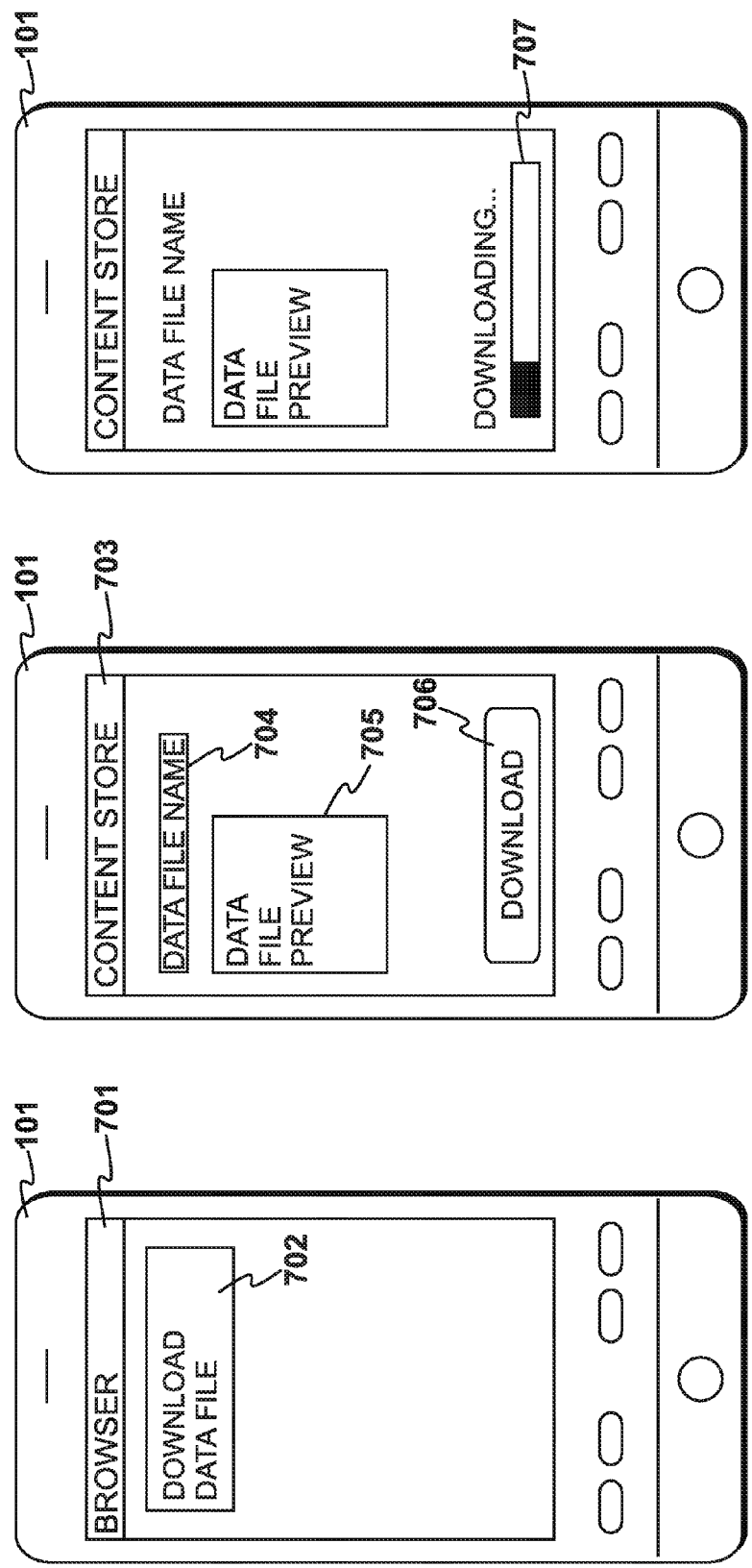
FIG. 7 illustrates the process a client device goes through to initiate the transfer of a data file.

The process a client device goes through to initiate the transfer of a data file, in this example data file 501, is illustrated in FIGS. 7A, 7B and 7C.

At a first stage, shown in FIG. 7A, a user of a client device such as smartphone 101 arrives, during a browsing session using browser 701, at a web page including a hyperlink 702 defining a particular URI. For the purposes of illustration, hyperlink 702 in this example is labelled "download data file", although it will be appreciated in most real-world scenarios hyperlink 702 will take the form of an image forming a banner advertisement or the like.

If a user selects hyperlink 702, then the URI of hyperlink 702 results in an application 703 to launch as shown in FIG. 7B.

Application 703 is responsible for co-ordinating the communication between the client device (smartphone 101) and a content provider (which is content provider 107 in this example) during a transfer session of a data file. The running of application 703 results in an exchange of network traffic between smartphone 101 and content provider 107 over cellular network 105, firstly comprising a request for metadata in order for application 703 to present a user with a data file page comprising information on the data file. As described previously with reference to FIG. 2, cellular network 105 comprises proxy server 203 which monitors this network traffic so as to track the initiation and progress of a transfer session. As shown in FIG. 7B, application 703 presents a user with metadata describing a data file, such as data file 501. In the example shown, the metadata comprises the data file's name 704 and a preview 705. Thus for example, if the data file comprised an application to be installed on smartphone 101, then preview 706 would comprise a screenshot, whilst if the data file was a video file, then preview 706 would comprise a single frame of the video.

Application 703 also includes a button 706, which is an interactive user interface element which, in this example, is labelled "download". As shown in FIG. 7C, if a user clicks button 706, then the transfer of the data file begins, with, as an example, a progress bar 707 presented to the user. The monitoring of the overall progress of a transfer session will be described further with reference to FIGS. 8 and 9, whilst the monitoring of network traffic to initiate a transfer session briefly described with reference to FIG. 7B will be described in further detail with reference to FIG. 10.

In an embodiment of the present invention, the initial selection of hyperlink 702 invokes an asynchronous connection between the browser 701 running on smartphone 101 and proxy server 203. When the transfer of a data file is using application 703 is complete, application 703 is configured to close and, using the asynchronous connection, proxy server 203 instructs browser 701 to load a predetermined page, such as a confirmation page or a readme file.

In some cases, a user may exit the particular data file page that application 703 originally opened. This may either be because they close application 703, or indeed they may then proceed to open another data file page relating to a different data file whilst application 703 is still running. If an access provider, such as cellular network 105, simply monitored the selection of hyperlink 702 and took that selection to indicate that the data file that it relates to has been transferred, then in such cases where a user has selected another data file accessible from a content provider, any gathered statistics will be incorrect. The present invention therefore provides a method of, and an associated proxy server for, verifying that the data file that should have been transferred has indeed been transferred.

FIG. 8

Figure 8:
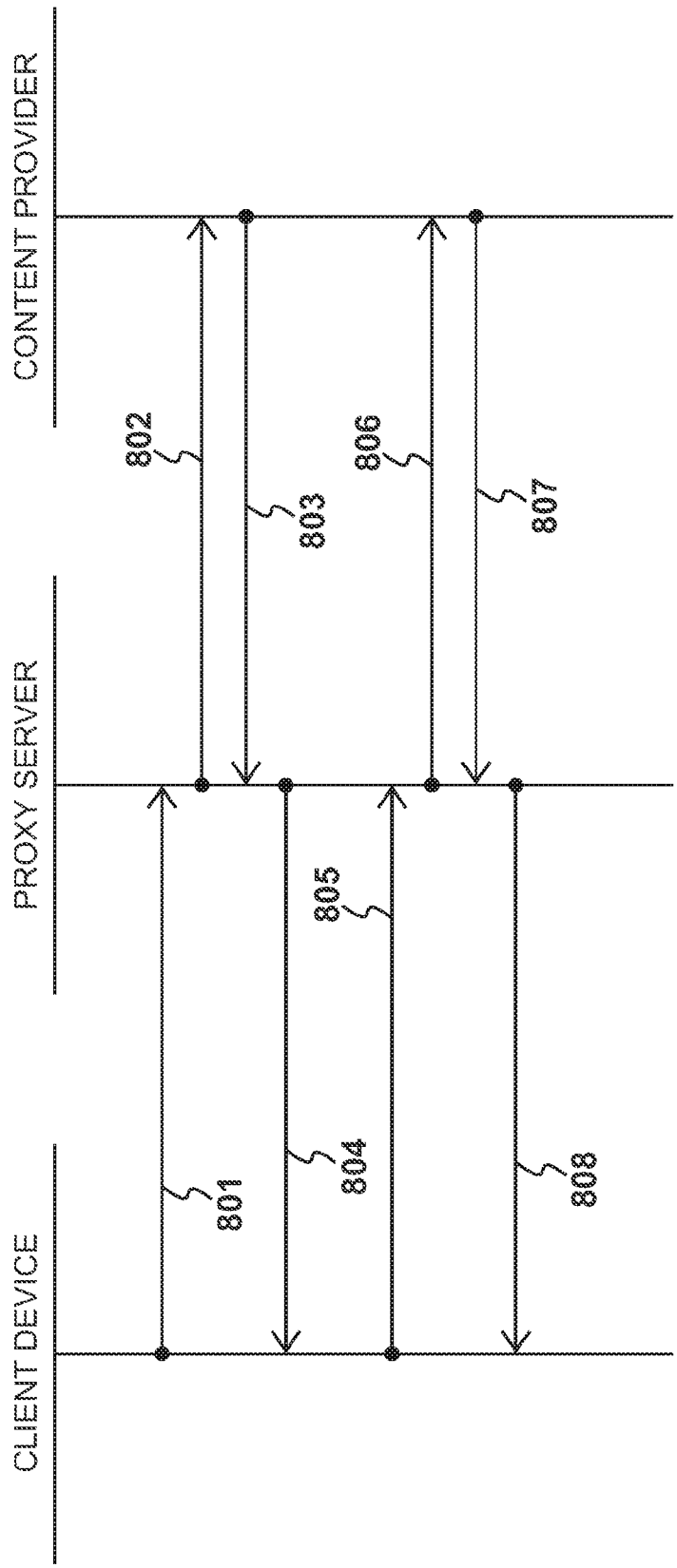
FIG. 8 illustrates the exchange of network traffic between a client device and a content provider via the proxy server.

The exchange of network traffic between a client device and a content provider, in this example smartphone 101 and content provider 107 respectively, via a proxy server 203 according to the present invention is illustrated in the form of a protocol diagram in FIG. 8.

At 801, a request for a selected data file is sent by smartphone 101 which is destined for a content provider 107. This request is sent as a result of a user selecting a hyperlink such as hyperlink 702 in browser application 701, as described with reference to FIG. 7A. Proxy server 203 intercepts this request, processes it to create a unique identifier for the client device, and associates the identifier with the fingerprint of the selected data file. At 802, proxy server 203 forwards the request to content provider 107. At 803, the reply from content provider 107, comprising metadata relating to the data file, is intercepted and processed by proxy server 203. At 804, the metadata is forwarded to smartphone 101. The procedures carried out to process a client device's request and a content provider's reply will be described further with reference to FIG. 10.

At 805, a download request (which contains the unique identifier for the client device) is sent from smartphone 101 as a result of a user selecting button 706. Proxy server 203 then proceeds to forward the download request to content provider 107 at 806. In an embodiment, proxy server 203 processes the download request by checking that it is a request for the originally selected data file. If it is not, then the request is dropped. If the download request is for the originally selected data file, then it is forwarded.

At 807, a data file is received from content provider 107, and is evaluated for characteristics, and verification that these characteristics match the fingerprint of the originally selected data file. If verification is successful, proxy server 203 forwards the received data file to smartphone 101 at 808. Depending upon the implementation, if verification is not successful, proxy server 203 either forwards the received data file anyway or discards the data file without forwarding to smartphone 101. The results of the verification process are written as confirmation data to a transfer statistics data structure, so as to maintain statistics on the number of successful and unsuccessful transfers of the selected data file.

In an embodiment, the local records of a transfer session, such as the unique identifier for the client device, are deleted so as to either reduce the amount of data retained or in order to alleviate privacy concerns.

FIG. 9

Figure 9:
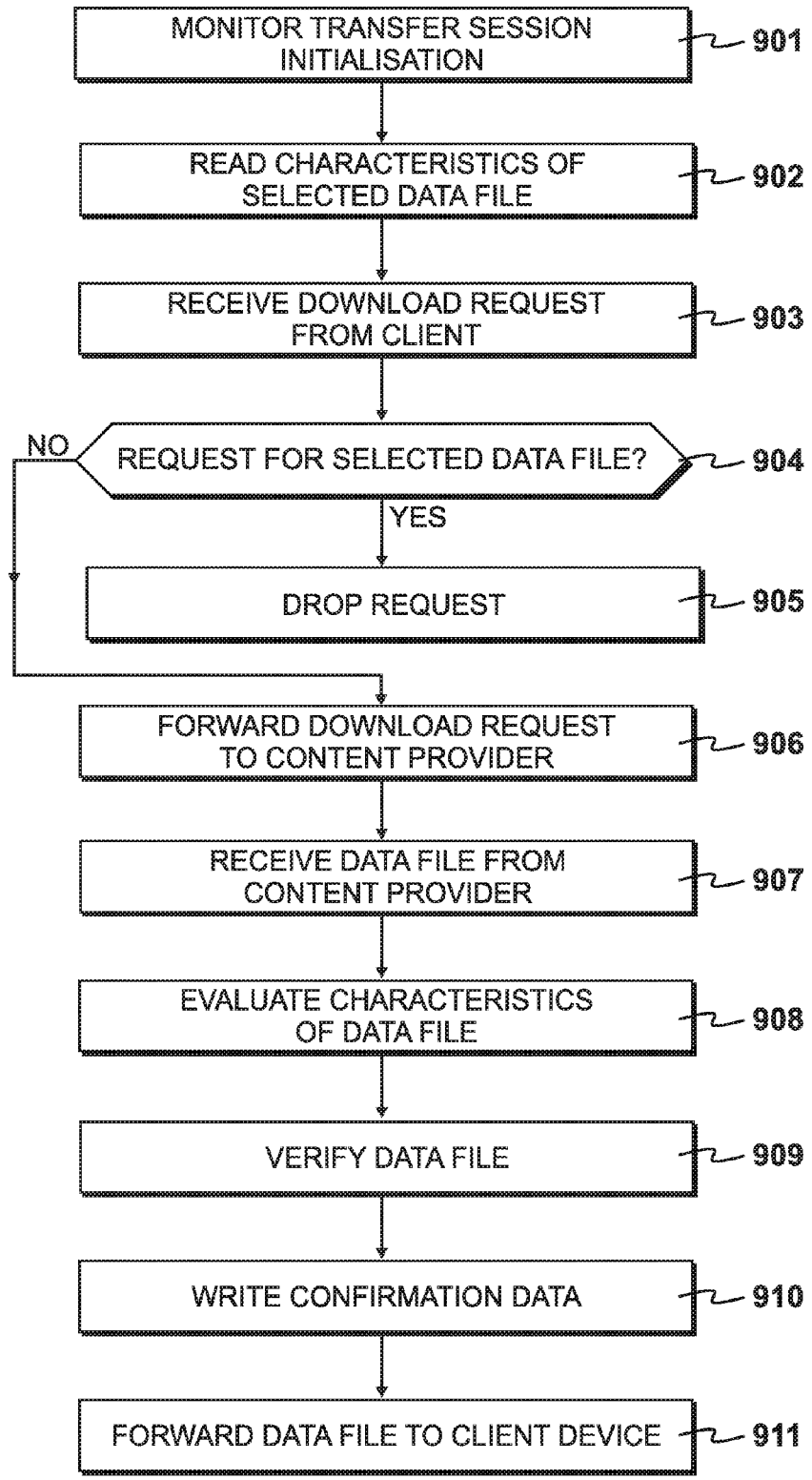
FIG. 9 details steps carried out to monitor a transfer session.

Steps carried out to monitor a transfer session are detailed in FIG. 9.

Figure 10:
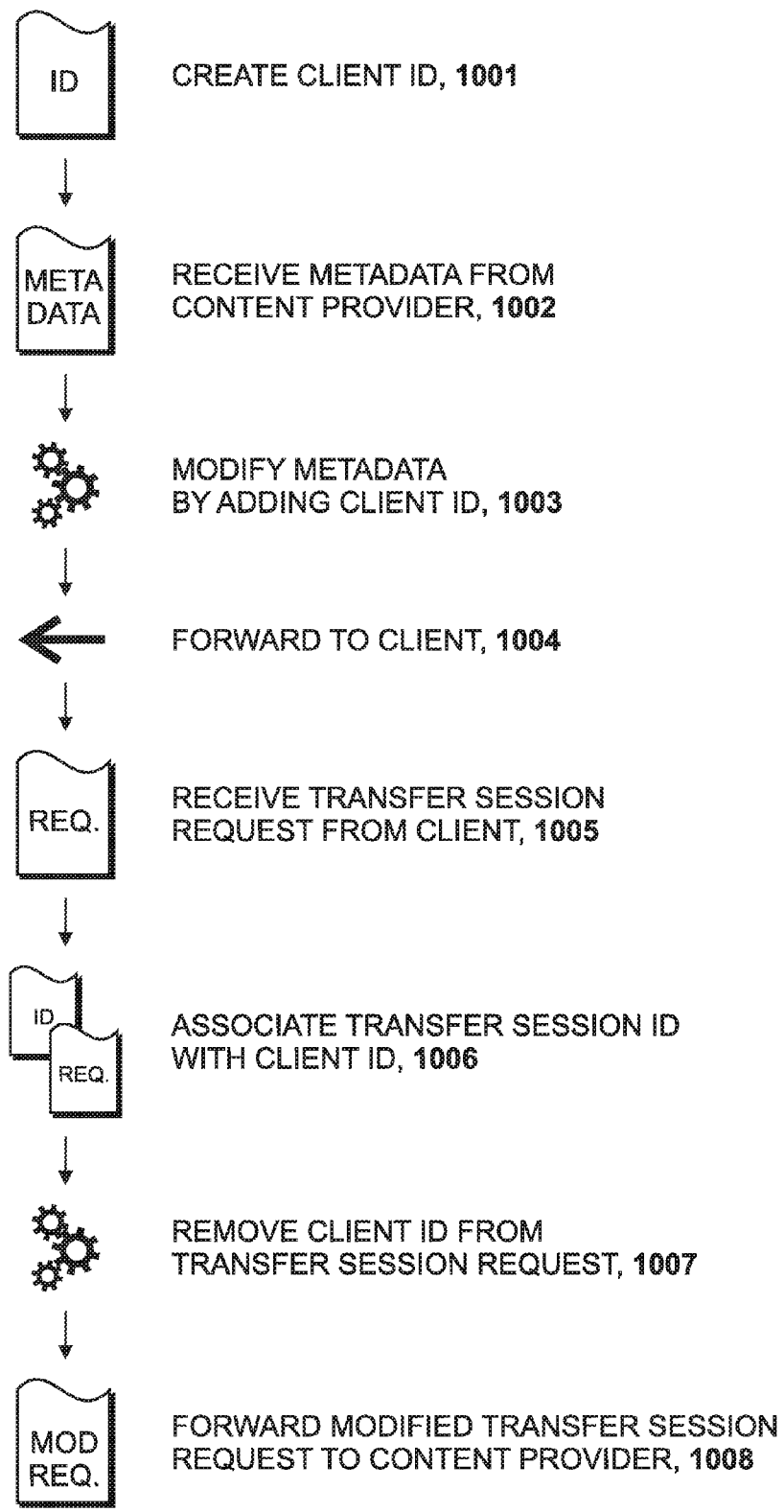
FIG. 10 details procedures carried out to monitor the initialisation of a transfer session.

At step 901, the initialisation of a transfer session is monitored; steps carried out during this procedure are described further with reference to FIG. 10. At step 902, the selected data file's characteristics, or fingerprint, are read from the characteristics list stored on hard disk drive 303.

At step 903, a download request is received from a client device such as smartphone 101, and, in this embodiment, at step 904 a question is asked as to whether the download request is a request for the selected data file. If this question is answered in the negative, the request is dropped at step 905, whilst if answered in the affirmative, control proceeds to step 906 where the request is forwarded to the content provider. In alternative embodiments, the download request is forwarded to the content provider irrespective of whether the request is actually for the selected data file. However, in this case, if the question asked at step 904 is answered in the negative, then information to this effect is written into a data structure containing data relating to transfers that have resulted in a user requesting a different data file to that which was originally selected.

At step 907, a data file is received as a received data file from a content provider, and at step 908 its characteristics are evaluated. At step 909, verification takes place to effect comparison of the characteristics of the received data file to those retrieved at step 902. After verification, the results of the verification process are written as confirmation data to a transfer statistics data structure at step 910, and at step 911 the data file is forwarded to the client device.

FIG. 10

Procedures carried out during step 901 to monitor the initialisation of a transfer session are detailed in FIG. 10, with reference to the network traffic routed by proxy server in FIG. 8.

After the first request (801) is issued by a client device, a unique identifier for the client device is created at step 1001. The unique identifier is allocated on a session-by-session basis, and so one particular client can be allocated several unique identifiers in dependence upon the number of transfer sessions they initiate.

After forwarding the request to the content provider (802), metadata is received that is related to the selected data file at step 1002. This metadata is then modified by injecting the unique identifier to create modified metadata at step 1003, which is then forwarded to the client device at step 1004. In an alternative example, the HTTP header of the HTTP transaction to send the metadata is modified rather than the metadata itself. At step 1005, a transfer session request is received from the client device. The transfer session request is a URI and comprises a transfer session identifier, the data file's name and a set of cookies, and was created based upon the modified metadata. It therefore still includes the unique identifier that was injected into the original metadata. The transfer session identifier is then associated with the unique identifier for the client device at step 1006, and at step 1007 the unique identifier is removed from the transfer session request to create a modified transfer session request. The modified transfer session request is forwarded to the content provider at step 1008, after which a local record of the initialisation of a transfer session is saved and step 901 is complete.

I claim:

1. A method of verifying the transfer from a content provider of a selected data file selected by a client device using a proxy server, comprising steps of:
    creating a local set of characteristics of the selected data file;
    monitoring network traffic sent between the client device and the content provider to create a local record of a transfer session by:
        creating a unique identifier for the client device;
        receiving metadata from the content provider related to said data file selected by the client device;
        creating modified metadata by modifying said metadata to include said unique identifier;
        forwarding said modified metadata to the client device;
        receiving a transfer session request from the client device that initiates a transfer session between the client device and the content provider, said transfer session request comprising a transfer session identifier in addition to said unique identifier;
        associating said transfer session identifier with said unique identifier to create said local record of the transfer session;
        removing said unique identifier from said transfer session request to create a modified transfer session request;
        forwarding said modified transfer session request to the content provider;
    receiving and forwarding a download request from the client device to initiate the transfer of the selected data file to the content provider;
    receiving a data file as a received data file from the content provider;
    evaluating characteristics of said received data file;
    verifying that the characteristics of said received data file match the local set of characteristics of the selected data file; and
    forwarding the received data file to the client device.

2. The method of claim 1, wherein said local set of characteristics includes the name of the data file, the size of the data file and a hash of the data file.

3. The method of claim 1, wherein said proxy server does not forward a download request from the client device to the content provider if a received download request is not for the selected data file.

4. The method of claim 1, wherein confirmation data is recorded in a data structure if said verifying step is successful.

5. The method of claim 1, wherein local records of transfer sessions are deleted when received data files are forwarded to client devices.

6. The method of claim 1, wherein said proxy server is configured to only receive and forward traffic that is sent between a plurality of client devices and said content provider.

7. The method of claim 1, wherein the transfer of said data file is invoked by an application running on said client device, and said application is configured to create said session identifier and to cease running when transfer of said data file is complete.

8. The method of claim 7, wherein said application is run in response to a user of said client device selecting a hyperlink in a web browser.

9. The method of claim 8, wherein the selection of a hyperlink invokes an asynchronous connection between said proxy server and said web browser, and said proxy server instructs said web browser to load a predetermined page using said asynchronous connection when transfer of said data file is complete.

10. A proxy server apparatus for verifying the delivery by a content provider of a selected data file selected by a client device, comprising a processor, memory and a network interface, wherein said processor is configured to:
create a local set of characteristics of the selected data file;
monitor network traffic sent between the client device and the content provider to create a local record of a transfer session by being configured to:
create a unique identifier for the client device;
receive metadata from the content provider related to said data file selected by the client device;
create modified metadata by modifying said metadata to include said unique identifier;
forward said modified metadata to the client device;
receive a transfer session request from the client device that initiates a transfer session between the client device and the content provider, said transfer session request comprising a transfer session identifier in addition to said unique identifier;
associate said transfer session identifier with said unique identifier to create said local record of the transfer session;
remove said unique identifier from said transfer session request to create a modified transfer session request;
forward said modified transfer session request to the content provider;
receive and forward a download request from the client device to initiate the transfer of the selected data file to the content provider;
receive a data file as a received data file from the content provider;
evaluate characteristics of said received data file;
verify that the characteristics of said received data file match the local set of characteristics of the selected data file; and
forward said data file to the client device.

11. The proxy server apparatus of claim 10, wherein said local set of characteristics includes the name of the data file, the size of the data file and a hash of the data file.

12. The proxy server apparatus of claim 10, wherein said processor is configured to prohibit forwarding of a download request from the client device to the content provider if a received download request is not for the selected data file.

13. The proxy server apparatus of claim 10, wherein said network interface is configured to only receive and forward traffic sent between a plurality of client devices and said content provider.

14. A non-transitory computer-readable medium having computer-readable instructions executable by a computer that, when executed by the computer, cause the computer to operate as a proxy server, and to carry out a method of verifying the transfer from a content provider of a selected data file selected by a client device, by performing steps of:
creating a local set of characteristics of the selected data file;
monitoring network traffic sent between the client device and the content provider to create a local record of a transfer session by:
creating a unique identifier for the client device;
receiving metadata from the content provider related to said data file selected by the client device;
creating modified metadata by modifying said metadata to include said unique identifier;
forwarding said modified metadata to the client device;
receiving a transfer session request from the client device that initiates a transfer session between the client device and the content provider, said transfer session request comprising a transfer session identifier in addition to said unique identifier;
associating said transfer session identifier with said unique identifier to create said local record of the transfer session;
removing said unique identifier from said transfer session request to create a modified transfer session request;
forwarding said modified transfer session request to the content provider;
receiving and forwarding a download request from the client device to initiate the transfer of the selected data file to the content provider;
receiving a data file as a received data file from the content provider;
evaluating characteristics of said received data file;
verifying that the characteristics of said received data file match the local set of characteristics of the selected data file; and
forwarding the received data file to the client device.

15. The non-transitory computer-readable medium of claim 14, wherein said local set of characteristics includes the name of the data file, the size of the data file and a hash of the data file.

16. The non-transitory computer-readable medium of claim 14, having additional computer-readable instructions that, when executed by the computer, cause the computer to prohibit forwarding of a download request from the client device to the content provider if a received download request is not for the selected data file.

17. The non-transitory computer-readable medium of claim 14, having additional computer-readable instructions that, when executed by the computer, cause the computer to only receive and forward traffic that is sent between a plurality of client devices and said content provider.

* * * * *